(12) United States Patent
Malasse et al.

(10) Patent No.: US 8,603,279 B2
(45) Date of Patent: Dec. 10, 2013

(54) PROCESS AND DEVICE FOR WELDING A THERMOPLASTIC STIFFENER

(71) Applicant: Airbus Operations (SAS), Toulouse (FR)

(72) Inventors: Pierric Malasse, Le Pellerin (FR); Florian Chotard, Nantes (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 13/633,336

(22) Filed: Oct. 2, 2012

(65) Prior Publication Data

US 2013/0092309 A1 Apr. 18, 2013

(30) Foreign Application Priority Data

Oct. 4, 2011 (FR) ...................................... 11 58945

(51) Int. Cl.
*B32B 37/00* (2006.01)
(52) U.S. Cl.
USPC ..................... 156/228; 156/583.1; 156/583.3; 156/583.4
(58) Field of Classification Search
USPC ........... 156/228, 391, 580, 581, 583.1, 583.3, 156/583.4
See application file for complete search history.

(56) References Cited

U.S. PATENT DOCUMENTS

| 2008/0230652 A1 | 9/2008 | Biornstad et al. |
| 2008/0246175 A1 | 10/2008 | Biornstad et al. |
| 2010/0124659 A1 | 5/2010 | Nelson et al. |
| 2011/0052897 A1* | 3/2011 | Goto et al. ..................... 428/223 |
| 2011/0073708 A1 | 3/2011 | Biornstad et al. |
| 2012/0061006 A1 | 3/2012 | Marquardt |

FOREIGN PATENT DOCUMENTS

| EP | 1 808 285 | 7/2007 |
| WO | WO 2006/001860 | 1/2006 |
| WO | WO 2010/094808 | 8/2010 |

OTHER PUBLICATIONS

Search Report and Written Opinion for FR 1158945 dated Apr. 27, 2012.

* cited by examiner

*Primary Examiner* — James Sells
(74) *Attorney, Agent, or Firm* — Nixon & Vanderhye P.C.

(57) ABSTRACT

The invention relates to a device for welding a stiffener to a skin. The stiffener has a stiffener foot with a bearing surface parallel to the skin surface and a stiffener flange projecting away from the plane of the bearing surface. The device includes a metallic support includes a seating surface matching the shape of the receiving side; a groove which accommodates a flange of the stiffener inserted in the groove; an insulative supporting structure for positioning a bearing surface against the receiving side; and a conformal panel for applying pressure forcing said bearing surface against said receiving side. A heater temporarily raises the temperature of bearing surface of the stiffener and the adjacent receiving side of the skin to above the melting point of the matrix when pressure is applied thereby welding the stiffener to the skin.

22 Claims, 3 Drawing Sheets

PROCESS AND DEVICE FOR WELDING A THERMOPLASTIC STIFFENER

This application claims priority to FR 20110058945 filed 4 Oct. 2011, the entire contents of each of which are hereby incorporated by reference.

BACKGROUND OF THE INVENTION

1. Field of the Invention

The invention relates to a process and a device for welding a thermoplastic stiffener to a skin. The invention more particularly, but not exclusively, relates to the welding of a stiffener and a skin both of which are made of a composite comprising reinforcing fibres in a thermoplastic matrix, the stiffener having an omega-shaped cross section.

2. Description of the Prior Art

The operation for welding a stiffener to a skin, both of which are made of a composite comprising a thermoplastic matrix, requires that at least the interface between the skin and the stiffener be heated to the melting point of the polymer forming the matrix of the skin or stiffener.

Under these conditions, the mechanical strength of said matrix is completely reduced, and, if it is not supported, the stiffener is liable to collapse under its own weight, even in the absence of an applied pressure. Moreover, since thermoplastic polymers have a tendency to expand when heated to their melting point, the volume of a part heated to this temperature during such an operation must be strictly limited, for example by way of tooling, so as to prevent defects appearing in the parts.

Thus, carrying out static welding of a stiffener to a skin, when said stiffener comprises a thermoplastic matrix, requires complex tooling that is expensive to produce and implement.

SUMMARY OF THE INVENTION

The subject of the present invention relates to a device for statically welding the bearing surface of a foot of a stiffener to a side, called the receiving side, of a skin, the stiffener comprising a foot and a flange lying in a plane perpendicular to said bearing surface, said device comprising:

a. a support made of a metallic material comprising a seating surface matching the shape of the receiving side of the skin;

b. a groove, located in said support, the profile of which is such as to allow the stiffener to be inserted in said groove;

c. supporting means made of a thermal insulator, for positioning the stiffener relative to the seating surface so that the bearing surface of said stiffener is flush with said seating surface;

d. a conformal panel and means for applying said conformal panel under pressure against the side of the skin opposite the receiving side; and e. means for locally heating the foot of the stiffener.

Thus, the device according to the invention makes it possible to concentrate heating in the zone to be welded, the supporting means insulating the heating zone, and the tooling, making contact with the skin, having sufficient mass and thermal conductivity to rapidly dissipate the heat transmitted by conduction into the stiffener and skin outside of the heated zones.

In addition, since the contact pressure is applied, by the conformal panel, to the skin, it is not necessary to support the stiffener in order for it to be able to withstand this contact pressure.

In practice, although the welding process is static, the features of the device according to the invention allow the welding temperature to be applied locally, and therefore just for the short amount of time necessary to create the weld, without thermally affecting the parts located outside of the welding zones.

The invention may be implemented according to the advantageous embodiments described below, which may be considered individually or in any technically feasible combination.

Advantageously, the localized heating means comprise a heating plate able to be applied against the foot of the stiffener. Thus heat is transmitted via contact with said heating plate to the foot of the stiffener, thereby enabling uniform heating of all of said foot.

Advantageously, the localized heating means comprise an electrical resistance able to heat said heating plate. This embodiment is particularly simple to implement since no fluid flow is required and nevertheless the thermal insulation of the heated zone enables rapid heating of the zone to be welded.

Advantageously, the supporting means hold the foot of the stiffener and the localized heating means. Thus, the thermal insulation provided by these supporting means, insulating both the foot and the heating means, favours a rapid increase in the temperature of the foot of the stiffener.

Advantageously, the foot of the stiffener is held by the supporting means over a distance, measured from the bearing face, incorporating the transition from the flange to said foot. Since this transition zone is particularly likely to deform, the supporting means are thus used to support it, the weight of the stiffener itself tending to apply said transition against the supporting means.

Advantageously, the supporting means are removable so that stiffeners of various sections may be received. This feature especially allows the configuration of the device to be tailored to the production tolerances of different batches of stiffeners, especially so as to ensure the latter lie flush with the seating surface.

According to one advantageous embodiment, the supporting means are made of a refractory material comprising a silicate-comprising hydraulic binder. Thus said means may be produced with precision by casting in a mould.

Advantageously, said supporting means are made of a material comprising more than 90% calcium silicate. Thus, said supporting means are a particularly good insulator and may be obtained by casting and then, if required, adjusted by machining for even greater precision.

Advantageously, the supporting means consist of two separate strips. Thus said supporting means are more easily produced by casting, and enable better control of effects related to differential thermal expansion between said refractory supporting means and the metallic support.

Advantageously, the heating plate is made of a metallic material the thermal expansion coefficient of which does not differ by more than 50% from that of the material forming the supporting means. Thus, the mechanical stresses introduced by the differential thermal expansion between the supporting means and the heating plate are reduced, and said means may be adjusted so as to fit together precisely, in order for the skin and the feet of the stiffeners not to be marked during the welding operation and the melting of the matrix.

The invention also relates to a process for welding the bearing surface of a foot of a stiffener made of a composite comprising reinforcing fibres in a thermoplastic matrix to a side, called the receiving side, of a skin, the thermoplastic polymer forming the matrix of the stiffener having a melting point and a glass transition temperature, said process comprising steps consisting in:

i. placing said stiffener on the supporting means of a device according to the invention so that the bearing surface of the stiffener is flush with the seating surface of the support;

ii. placing the skin on the support of said device, the receiving side of said skin making contact with the seating surface;

iii. placing the conformal panel on the skin;

iv. applying pressure to the conformal panel;

v. actuating the localized heating means while maintaining the pressure on the conformal panel until the thermoplastic polymer forming the matrix of the stiffener melts;

vi. turning off the localized heating means while still applying pressure to the conformal panel; and vii. releasing the pressure on the conformal panel when the temperature of the foot of the stiffener is lower than the glass transition temperature of the thermoplastic polymer forming the matrix of the stiffener.

Thus, said process allows a plurality of stiffeners to be welded, in a particularly economical way, to a skin in a single operation, the welding cycle lasting a constant length of time however many stiffeners are welded in said cycle.

BRIEF DESCRIPTION OF THE DRAWINGS

Features and advantages of the invention will be better understood by virtue of the following description, which description demonstrates features of the invention by way of a non-limiting exemplary embodiment.

The description refers to the appended figures in which.

DETAILED DESCRIPTION OF EMBODIMENTS

Figure 1:
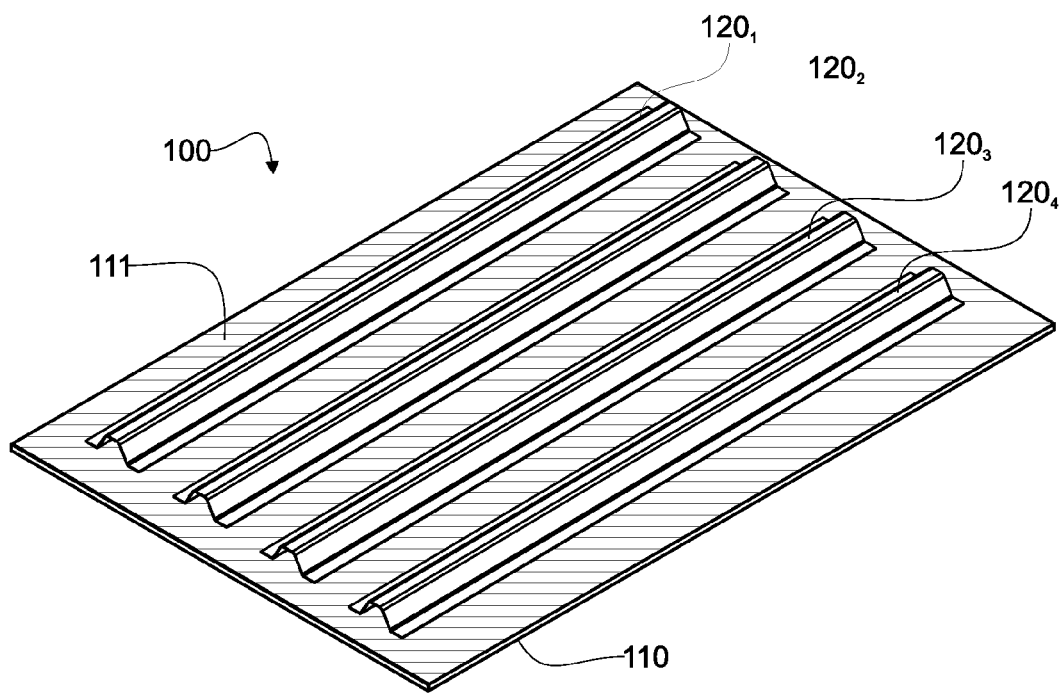
FIG. 1 shows a perspective view of an exemplary stiffened panel comprising a skin and stiffeners.

A stiffened panel (100) consisting of a skin (110) to which stiffeners $120_1, 120_2, 120_3, 120_4$ have been fixed is shown in FIG. 1. Said stiffeners are fixed so as to bear against one of the sides, called the receiving side (111), of the skin (110).

Figure 2:
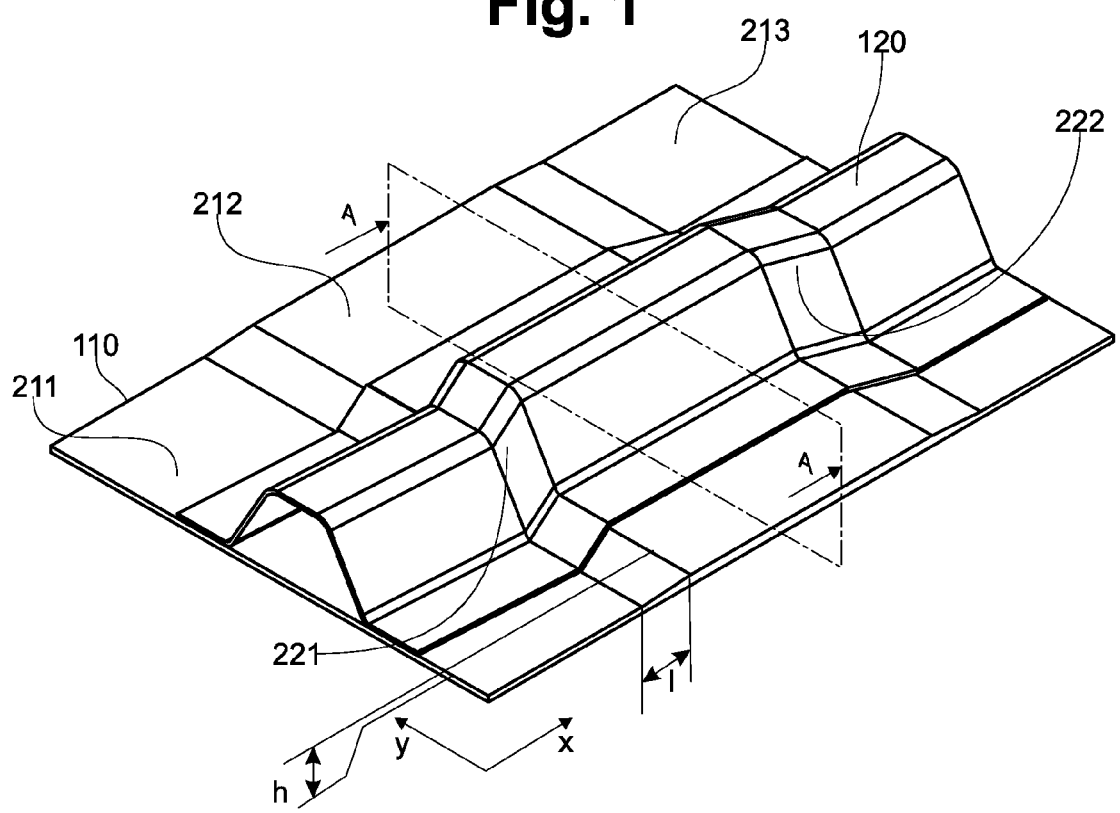
FIG. 2 shows a perspective view of a stiffened panel, which panel comprises a reinforcing ply drop-off structure on its stiffener-receiving surface.

According to an exemplary embodiment illustrated in FIG. 2, the skin (110) consists of layers of plies of continuous fibres in a thermoplastic polymer matrix, obtained by draping and compression/consolidation techniques known in the prior art.

The draping operation may comprise producing ply drop-offs so as to form zones of different thicknesses, forming tiers (211, 212, 213) on either side of the skin (110).

To ensure load transfer to all the corresponding plies of the thickness reinforcement (212), the ply drop-off zone, i.e. the zone linking two tiers (211, 212), is produced with a taper h/l. Generally said taper is between 0.05 and 0.1.

According to this embodiment, the stiffener (120) comprises inflections (221, 222) opposite changes in the thickness of the skin.

Said inflections (221, 222) are obtained during the manufacture of the stiffener, which may advantageously be produced by hot pressing a pre-consolidated sheet of a composite comprising a thermoplastic matrix using techniques known in the prior art.

The stiffener (120) is thus formed so that the inflections (221, 222) in said stiffener closely follow thickness changes, corresponding to the transitions from one tier to another, on the surface of the skin (110).

Figure 3:
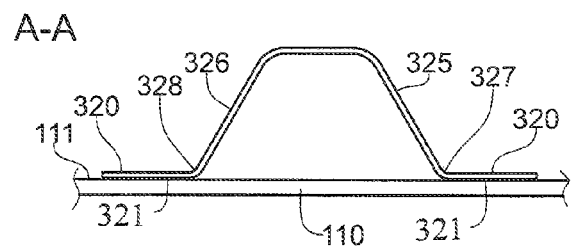
FIG. 3 is a view of a cross section A-A, defined in FIG. 2, showing a stiffener with a omega-shaped section fixed to a skin.

As may be seen in the cross-sectional view shown in FIG. 3, the stiffener (120), in this exemplary embodiment, has an omega-shaped cross section and comprises a foot (320). This foot (320) comprises, on one of its sides, what is called a bearing face (321), which face is able to press against the receiving side (111) of the skin (110).

Two flanges (325, 326) extend, in cross section, from said foot (320) in a plane that is substantially perpendicular to the bearing surface (321), in this instance the cross-sectional plane (A-A) corresponding to the view in FIG. 3. Said flanges (325, 326) are connected to said foot (320) by transition zones (327, 328), in this instance transitional radii in this cross-sectional view.

Figure 4:
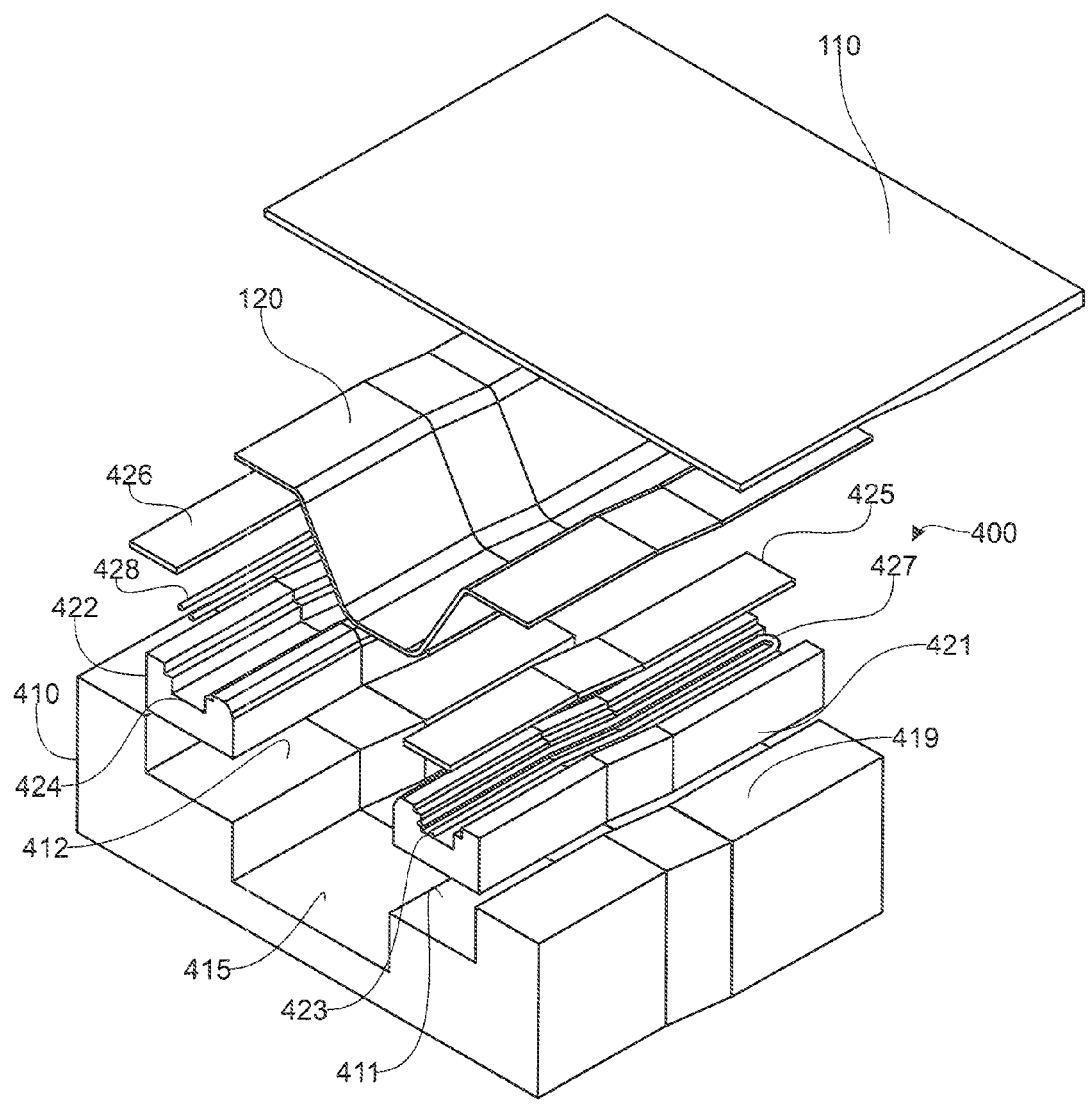
FIG. 4 shows an exploded perspective view of an exemplary embodiment of a welding device according to the invention.

As illustrated in FIG. 4, the device according to the invention comprises a support (410), which support is made of a metallic material, for example easily machinable E24 mild carbon steel having an elastic limit of 240 MPa.

Said support comprises a seating surface (419) the profile of which is a negative of the receiving surface of the skin (110).

This support contains a groove (415) able to encompass the stiffener (120). According to this exemplary embodiment, two strips (421, 422), made of a refractory material mainly based on calcium carbonate, are placed in rebates (411, 412) on either side of said groove (415). Said strips (421, 422) comprise a shouldered groove (423, 424) able to receive heating means.

Said heating means consist, according to this exemplary embodiment, of electrical resistances (427, 428) placed in each groove (423, 424) in the refractory strips (421, 422), said grooves (423, 424) being covered by plates (425, 426) called heating plates. These heating plates are made of an iron/nickel (Fe/Ni) alloy sold under the trade names Invar® or Pernifer® and the Curie temperature of which is higher than the melting point of the polymer forming the matrix of the stiffeners (120) and the skin (110) to be welded.

Such a material has a coefficient of thermal expansion of between $1\times10^{-6}$ K$^{-1}$ and $5\times10^{-6}$ K$^{-1}$ at the melting point of said thermoplastic matrix.

The refractory strips (421, 422) are obtained by casting calcium silicates in a mould. The solidified strips are then baked so as to remove any trace of moisture therefrom.

After they have been unmoulded, the strips (421, 422) may be machined for even greater geometrical precision. Since they consist of 90% calcium silicate ($CaO_2SiO_4$) the strips have a low thermal expansion coefficient, of the same order of magnitude as that of the metallic material forming the heating plates. This makes it possible to avoid precise adjustment of the various parts, without running the risk of excessive stresses due to differential thermal expansions. This low thermal expansion coefficient also enables said strips to withstand thermal shocks.

Figure 5:
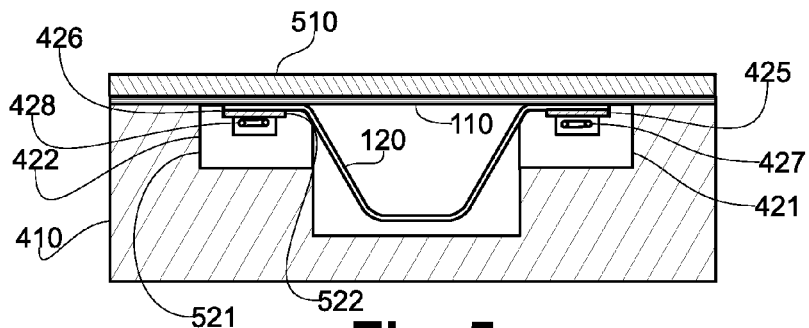
FIG. 5 is a cross-sectional view of a device according to an exemplary embodiment of the invention shown during welding of a omega-shaped stiffener to a skin.

Now, with regard to FIG. 5, it will be observed that, in the present completely non-limiting exemplary embodiment, the dimensions of the rebates (411, 412) in the support, and the strips are adjusted so that the longitudinal edges of said strips (421, 422) are flush with the seating surface of the support.

The grooves (423, 424) in the strips (421, 422) are adjusted so that the surfaces of the heating plates (425, 426) are flush with the surface of the strips.

Said strips are adjusted so that there is no play at the lateral interfaces with the support (521) and with the heating plates (522) at the welding temperature so as to prevent the polymer, forming the matrix of the parts to be assembled, from flowing into these interfaces.

Since the heating plates (425, 426) are inserted in grooves (423, 424) in the thermally insulating strips, said plates are very rapidly heated by the thermal resistances (427, 428) located just below the plates and also inserted in said grooves (423, 424).

The material forming the support (410) and the material forming the heating plates is 140 times more conductive than the strips (421, 422) from the thermal point of view and its thermal diffusivity is about six times higher than that of said strips.

Thus, when the heating means are activated, by making an electrical current flow through the resistances (427, 428), the heating plates (425, 426) are rapidly and uniformly heated to the desired temperature.

Heat is transmitted to the foot of the stiffener (120) and propagates through said stiffener, essentially by way of the fibres when the latter are made of carbon, especially toward the flange of said stiffener. Beyond the heating plates, said stiffener makes contact with the skin (110) and with the strips (421, 422). Since said strips have a high specific heat per unit weight, heat exchange with the skin (110) is promoted. The skin makes contact with the seating surface of the support. The specific heat per unit weight of the support (410) is lower than that of the strips whereas its conductivity and its thermal diffusivity are clearly higher than those of the strips.

Thus, the heat that the skin receives by way of the foot of the stiffener (120) is removed via its contact with the support, which support (410) is isolated from the heating plates (425, 426) by the refractory strips. Thus, the materials chosen for the device according to the invention and the arrangement of its parts allow the temperature increase to be concentrated at the interface between the stiffener (120) and the skin (110) making it possible to rapidly heat this interface zone to the melting point of the matrix of the materials forming the stiffener (120) and the skin (110).

Since the flange of the stiffener is also heated, said flange is supported by the refractory strips in the transition zone between said flange and the foot of the stiffener (120), in order to prevent it from collapsing under the effect of its own weight.

The pressure required to carry out the welding is provided by a conformal panel (510) applied to the side of the skin (110) opposite the receiving side. Thus, no pressure is applied directly to the stiffener and only the foot of said stiffener is subjected to this welding pressure. The conformal panel advantageously consists of a composite comprising reinforcing fibres in an inorganic polymer matrix based on alkalimetal aluminosilicates. Such a material is for example marketed by Pyromeral Systems S.A., 13 rue d'Ognon, 60 810 Barbery, France, under the trade name Pyrotool®. This material has a low thermal effusivity, of about 800 $J.K^{-1}.m^{-2}.s^{-1/2}$ so that heat exchange with the skin is reduced, thus promoting localized temperature increase during the welding operation.

The device according to the invention is also perfectly suited for welding T-shaped stiffeners. For this purpose, it is enough to change the strips (423, 424) so as to tailor them to stiffeners with a different section.

Insofar as the surfaces must be precisely flush to stop the parts from being marked, various strips may be used to allow thickness variations between batches of stiffeners to be taken into account. Since heat propagates at least as far as the transition between the flange of the stiffener and the foot, a relative change in form between the skin and the stiffener occurs during the welding operation.

Figure 6:
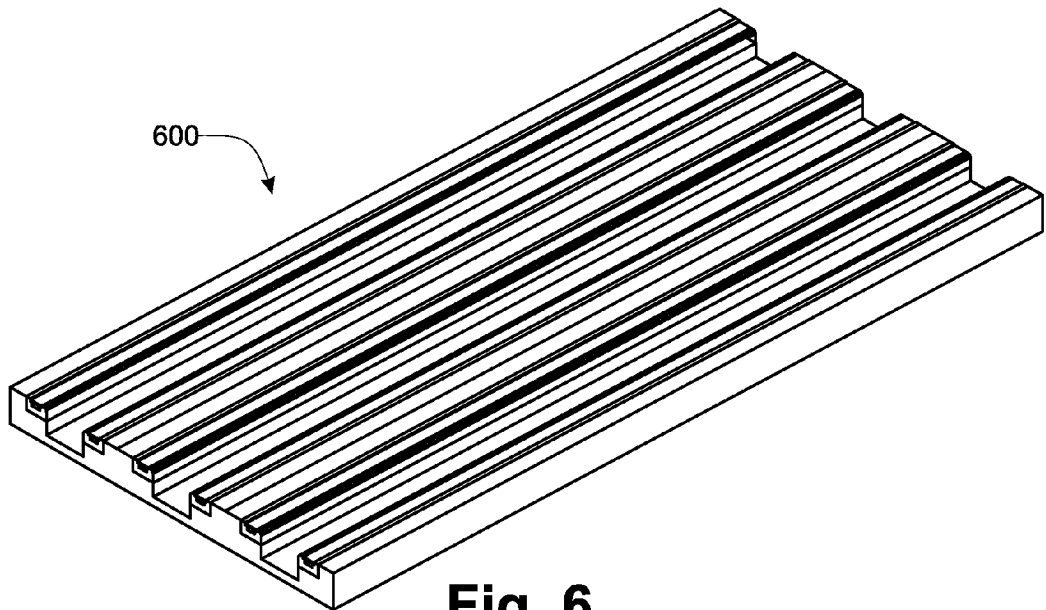
FIG. 6 shows an exemplary embodiment of a device according to the invention, designed to weld a plurality of stiffeners to a skin.

Devices according to the invention may advantageously be combined, in order to create tooling (600) suited to welding (see FIG. 6), in a single cycle, a plurality of stiffeners to a skin. Such tooling may comprise autonomous means (not shown) for applying pressure to the conformal panel, or may be placed in an autoclave.

Figure 7:
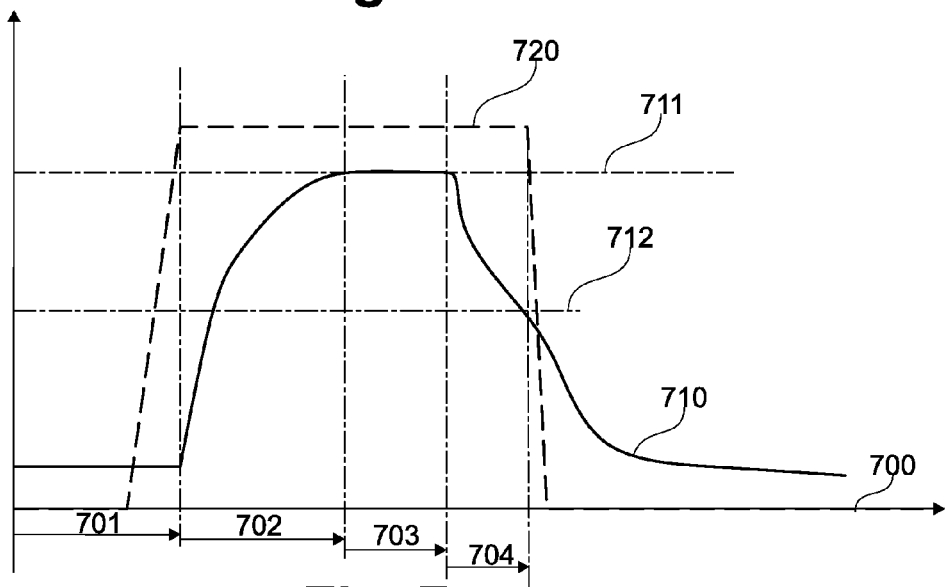
FIG. 7 shows an exemplary temperature/pressure cycle suited to welding a stiffener comprising a thermoplastic matrix to a skin.

FIG. 7 shows an exemplary temperature/pressure cycle suited to welding a stiffener comprising a thermoplastic matrix to a skin, once the stiffeners, the skin, and the conformal panel have been installed on a tooling according to an embodiment of the invention.

In a pressure (720) and temperature (710) cycle, as a function of time (700), a first step (701), called a pressurization step, consists of applying pressure (720) to the conformal panel.

During a heating step (702) the interface between the skin and the feet of the stiffeners is heated to a temperature (710) above the melting point (711) of the matrix of the stiffener, while the pressure (720) is maintained. The temperature rise is obtained, for example, by making an electrical current flow through the resistances (727, 728). The temperature may be controlled via slaving to a measurement made by a thermocouple, or the heating time required at a given current magnitude may be determined empirically.

After the temperature and pressure are optionally held constant (703), the heating means are turned off so as to begin cooling (704), the pressure on the conformal panel being maintained.

When the temperature (710) has dropped below the glass transition temperature (712) of the matrix of the stiffener, the pressure (720) may be released.

The length of the cycle is substantially the same however many stiffeners are welded.

The above description and the exemplary embodiment demonstrate that the invention allows a plurality of stiffeners, especially of omega-shaped section, to be economically and rapidly welded to a skin, even when the receiving surface of said skin is reinforced locally with ply drop-off structures.

Although the figures referred to in the above description showed, for the sake of simplicity, a flat skin, the device according to the invention is perfectly suited to welding stiffeners to a skin with a double curvature, provided that the stiffeners are preformed with a suitable shape before welding.

The invention claimed is:

1. A device for statically welding a stiffener to a receiving surface of a skin where both the stiffener and the skin are made of a thermoplastic composite material, the stiffener comprising a stiffener foot having a bearing surface parallel to a portion of said receiving surface and a stiffener flange projecting away from said portion of the bearing surface, said device comprising:
   a metallic support including:
      a seating surface substantially matching the shape of the receiving side of the skin:

a groove sufficiently large so as to encompass said stiffener flange when said flange is located in said groove; and a thermal insulator located in and flush with said seating surface and extending over at least a portion of but not all of said bearing surface of said stiffener when said stiffener flange is located in said groove;

a conformal panel and means for applying pressure to said skin forcing at least a portion of said receiving surface into contact with a portion of said bearing surface over at least a portion of said insulator; and heating means for heating only a portion of said at least said contacting portion of said receiving surface and said bearing surface to a temperature above the melting point of said thermoplastic material.

2. The device according to claim 1, wherein the heating means comprises a heating plate flush mounted with said thermal insulator.

3. The device according to claim 1, wherein the heating means comprises an electrical resistance heater configured to heat said heating plate.

4. The device according to claim 1, wherein the thermal insulators has said heating means located therein.

5. The device according to claim 4, wherein the stiffener foot is held against said thermal insulator from an edge of the foot to a transition between said foot and said flange.

6. The device according to claim 1, wherein the thermal insulator is replaceable so that stiffeners of various sizes and shapes may be received.

7. The device according to claim 1, wherein the thermal insulator is made of a refractory material comprising a silicate-comprising hydraulic binder.

8. The device according to claim 7, wherein the refractory material comprises more than 90% calcium silicate.

9. The device according to claim 6, wherein stiffener comprises two stiffener feet and the thermal insulator comprises two separate strips positioned so that one strip engages one foot and the other strip engages the other foot.

10. The device according to claim 1, wherein said heating means is received into a groove in said thermal insulator and comprises a plate mounted flush with an upper surface of the insulator and a heater element between the insulator and the plate, wherein the plate is made of a metallic material having a thermal expansion coefficient of which does not differ by more than 50% from a thermal expansion coefficient of the material forming the thermal insulator.

11. A method for statically welding a stiffener to a skin using the device of claim 1, said welding process welds a portion of said bearing surface to said receiving surface, and a thermoplastic polymer forming the matrix of the stiffener and the skin has a melting point and a glass transition temperature, said method comprising the steps of:

placing said stiffener on said metallic support with a portion of the stiffener foot overlying a portion of the thermal insulator and the stiffener flange extending into said groove;

placing the skin on the metallic support with the receiving surface in contact with at least a portion of said bearing surface and located over said thermal insulator;

placing the conformal panel on the skin;

applying pressure to the conformal panel;

actuating the heating means while maintaining the pressure on the conformal panel until the melting point of the thermoplastic polymer is reached;

turning off the heating means while still applying pressure to the conformal panel; and releasing the pressure on the conformal panel when the temperature of the foot of the stiffener is lower than the glass transition temperature of the thermoplastic polymer forming the matrix of the stiffener.

12. A device for statically welding a stiffener to a receiving surface of a skin where both the stiffener and the skin are made of a thermoplastic composite material, the stiffener comprising a stiffener foot having a bearing surface parallel to a portion of said receiving surface, a stiffener flange projecting away from said portion of the bearing surface, and a transition portion joining said foot and said flange, said device comprising:

a metallic support including:

a seating surface substantially matching the shape of the receiving side of the skin:

a groove sufficiently large so as to encompass said stiffener flange when said flange is located in said groove; and a thermal insulator located in and flush with said seating surface and extending over at least a portion of but not all of said bearing surface of said stiffener when said stiffener flange is located in said groove;

a conformal panel and means for applying pressure to said skin forcing at least a portion of said receiving surface into contact with a portion of said bearing surface over at least a portion of said insulator and supporting said transition portion; and heating means for heating only a portion of said at least said contacting portion of said receiving surface not including said transition portion and said bearing surface to a temperature above the melting point of said thermoplastic material.

13. The device according to claim 12, wherein the heating means comprises a heating plate flush mounted with said thermal insulator.

14. The device according to claim 12, wherein the heating means comprises an electrical resistance heater configured to heat said heating plate.

15. The device according to claim 12, wherein the thermal insulators has said heating means located therein.

16. The device according to claim 15, wherein the stiffener foot is held against said thermal insulator from an edge of the foot to said transition between said foot and said flange.

17. The device according to claim 12, wherein the thermal insulator is replaceable so that stiffeners of various sizes and shapes may be received.

18. The device according to claim 12, wherein the thermal insulator is made of a refractory material comprising a silicate-comprising hydraulic binder.

19. The device according to claim 18, wherein the refractory material comprises more than 90% calcium silicate.

20. The device according to claim 17, wherein stiffener comprises two stiffener feet and the thermal insulator comprises two separate strips positioned so that one strip engages one foot and the other strip engages the other foot.

21. The device according to claim 12, wherein said heating means is received into a groove in said thermal insulator and comprises a plate mounted flush with an upper surface of the insulator and a heater element between the insulator and the plate, wherein the plate is made of a metallic material having a thermal expansion coefficient of which does not differ by more than 50% from a thermal expansion coefficient of the material forming the thermal insulator.

22. A device for statically welding a stiffener to a receiving surface of a skin where both the stiffener and the skin are made of a thermoplastic composite material, the stiffener comprising a stiffener foot having a bearing surface parallel to a portion of said receiving surface and a stiffener flange projecting away from said portion of the bearing surface, said device comprising:
- a metallic support including:
  - a seating surface substantially matching the shape of the receiving side of the skin:
  - a groove sufficiently large so as to encompass said stiffener flange when said flange is located in said groove; and
  - a thermal insulator located in and flush with said seating surface and extending over at least a portion of said bearing surface of said stiffener when said stiffener flange is located in said groove;
- a conformal panel and means for applying pressure to said skin forcing at least a portion of said receiving surface into contact with a portion of said bearing surface over at least a portion of said insulator; and
- heating means for heating at least said contacting portion of said receiving surface and said bearing surface to a temperature above the melting point of said thermoplastic material.

\* \* \* \* \*